United States Patent [19]
Stephenson et al.

[11] 3,913,861
[45] Oct. 21, 1975

[54] VEHICLE SENSITIVE RETRACTOR WITH DOUBLE PENDULUM

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, New York, N.Y.

[22] Filed: July 10, 1974

[21] Appl. No.: 487,329

[52] U.S. Cl. .............................................. 242/107.4
[51] Int. Cl.² ........................................ B65H 75/48
[58] Field of Search ..................... 242/107.4–107.6; 280/150 SB; 297/386–388

[56] References Cited
UNITED STATES PATENTS

| | | | |
|---|---|---|---|
| 2,650,655 | 9/1953 | Neahr et al. | 242/107.4 X |
| 2,845,234 | 7/1958 | Cushman et al. | 242/107.4 |
| 3,552,676 | 1/1971 | Weber | 242/107.4 |
| 3,825,205 | 7/1974 | Takada | 242/107.4 |
| 3,838,831 | 10/1974 | Bell | 242/107.4 |

Primary Examiner—Leonard D. Christian
Attorney, Agent, or Firm—John P. Kirby, Jr.; Jonathan Plaut

[57] ABSTRACT

The vehicle-sensitive retractor has an improved inertia mechanism and support. The inertia mechanism is a lower pendulum assembly which includes a pendulum head in contact with an actuating means. The support for the lower pendulum assembly is an upper pendulum assembly which includes a trunnion, a swivel axis for the trunnion, and a support member for the trunnion. The trunnion has a substantially circular support edge upon which the pendulum head of the lower pendulum assembly is disposed. The trunnion and lower pendulum assembly are adapted to pivot automatically in one plane to a variety of operable static positions according to the position in which the retractor is oriented by virtue of installation in the vehicle. The lower pendulum assembly and trunnion comprise a double pendulum mechanism.

6 Claims, 5 Drawing Figures

VEHICLE SENSITIVE RETRACTOR WITH DOUBLE PENDULUM

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allows the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engagable with a ratchet wheel on the belt reel. When the pendulum assembly is displaced from its normally vertical position by acceleration, deceleration or change in orientation of the vehicle, the pendulum assembly moves the pawl into engagement with the ratchet wheel, preventing further withdrawal of the belt. United States patent application Ser. No. 312,534 filed Dec. 6, 1972 in the name of Lon E. Bell discloses an example of such a retractor.

It is important for the pendulum assembly to be in a substantially vertical position prior to actuation by acceleration, deceleration or change in orientation of the vehicle, so that the safety belt can be moved without locking the belt reel. It is desirable to have an improved, universal pendulum assembly and support assembly which are adjustable and do not need to be redesigned for different vehicles in order to have the pendulum assembly disposed vertically in its static position prior to actuation. This is desirable because the retractor needs to be mounted in various positions and various orientations within different vehicles. Sometimes the retractor needs to be tilted.

SUMMARY OF THE INVENTION

The retractor of this invention is vehicle-sensitive and inertia-operated. The retractor has a reel for winding a safety belt, means to lock the reel and thereby restrain an occupant of the vehicle during emergency situations, an improved inertia mechanism, an improved support mounted on the retractor for supporting the inertia mechanism, and an improved actuating means responsive to the inertia mechanism for operating the means for locking the reel. The inertia mechanism is a lower pendulum assembly which includes a pendulum head in contact with the actuating means. The support for the lower pendulum assembly is an upper pendulum assembly which includes a trunnion, a swivel axis for the trunnion, and a support member for the trunnion. The trunnion has a substantially circular support edge upon which the pendulum head is disposed. The trunnion and lower pendulum assembly are adapted to pivot in one plane to a variety of operable static positions to which the trunnion and lower pendulum assembly are adjustable according to the position in which the retractor is oriented by virture of installation in the vehicle. The swivel axis for the trunnion is adapted to allow the trunnion to pivot in one plane. The support member is adapted to support the trunnion.

Optionally, the support may also include a trunnion weight, attached to the trunnion and forming the upper part of the trunnion. The trunnion weight encourages pivoting motion of the trunnion. The retractor has two separate pivoting actions: (1) the pivoting action between the lower pendulum assembly and the trunnion; and (2) the pivoting action between the trunnion and the support member. The lower pendulum assembly and trunnion comprise a double pendulum mechanism. The actuating means is a post disposed above the pendulum head. Typically, a reel locking means includes one or more ratchet wheels and a pawl, although other reel locking means may also be used. The actuating post has an unlocked position and a locked position. The actuating post is disposed in the unlocked position when the trunnion and lower pendulum assembly are in any one of their variety of operable static positions. The actuating post is moved to the locked position by movement of the lower pendulum assembly during emergency situations to engage the pawl in the ratchet wheels to lock the reel and prevent further unwinding of the belt from the reel.

The retractor has a longitudinal axis. The trunnion has a longitudinal axis which is approximately perpendicular to the swivel axis for the trunnion. The static position of the trunnion and lower pendulum assembly is adjustable automatically in two opposed lateral directions in one plane from a static position wherein the longitudinal axis of the trunnion and lower pendulum assembly are disposed at an angle of approximately 0° to an angle of approximately 30° with reference to the longtitudinal axis of the retractor. The retractor further includes a support structure including two parallel side walls and a back wall. The support member for the trunnion is disposed between the side walls. The inertia mechanism and support are universal and unique because they do not have to be redesigned for use in different vehicles in order to have the lower pendulum assembly disposed substantially vertically for the purpose of allowing the retractor to remain unlocked in normal operation. If the retractor is turned partly on its side, that is, tilted for installation, the upper pendulum assembly adjusts automatically by pivoting action which enables the lower pendulum assembly to be disposed substantially vertically under static conditions.

DETAILED DESCRIPTION

Figure 1:
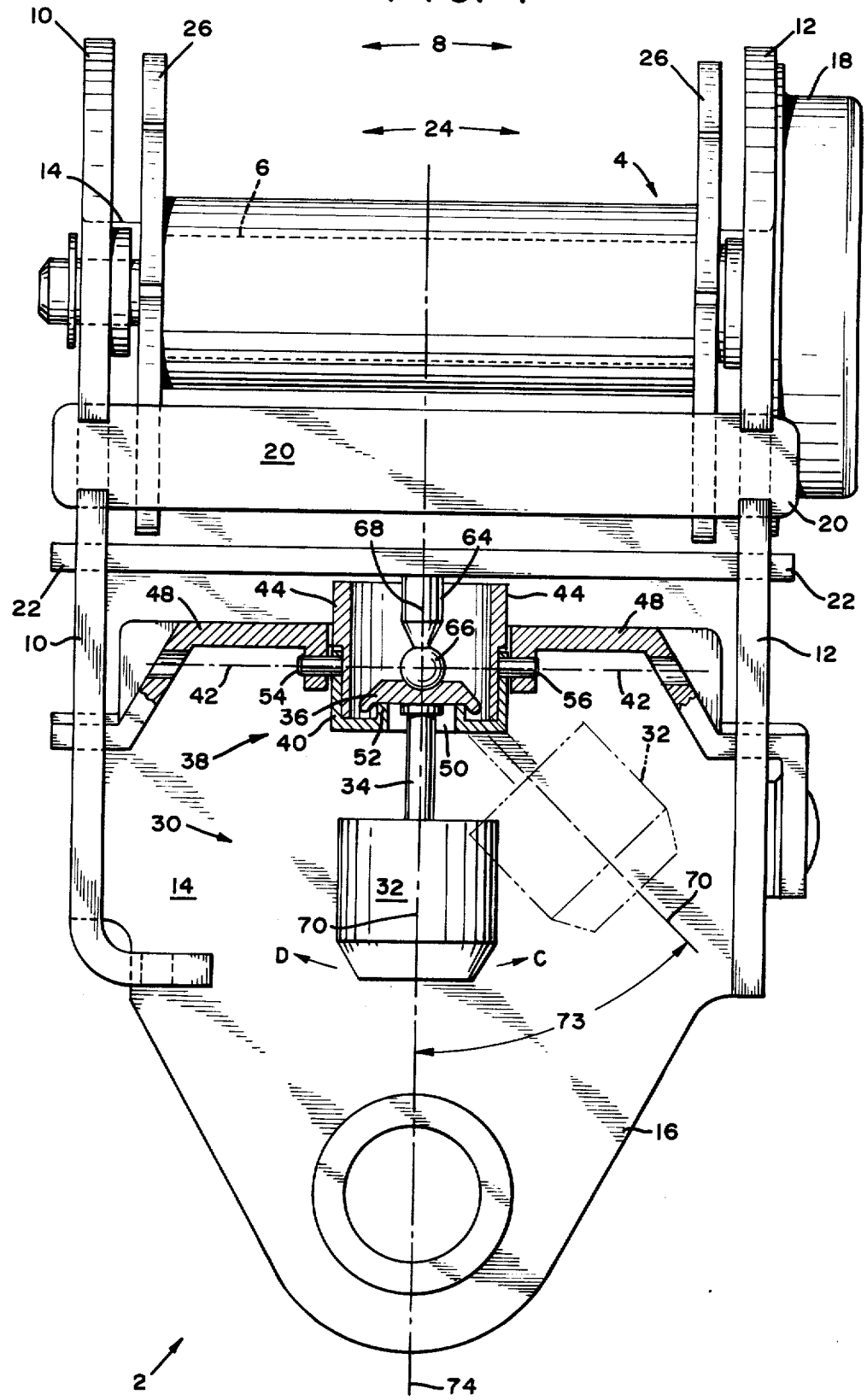
FIG. 1 is a front elevational view of the retractor of this invention having an improved inertia mechanism, support, and actuating means.
Figure 2:
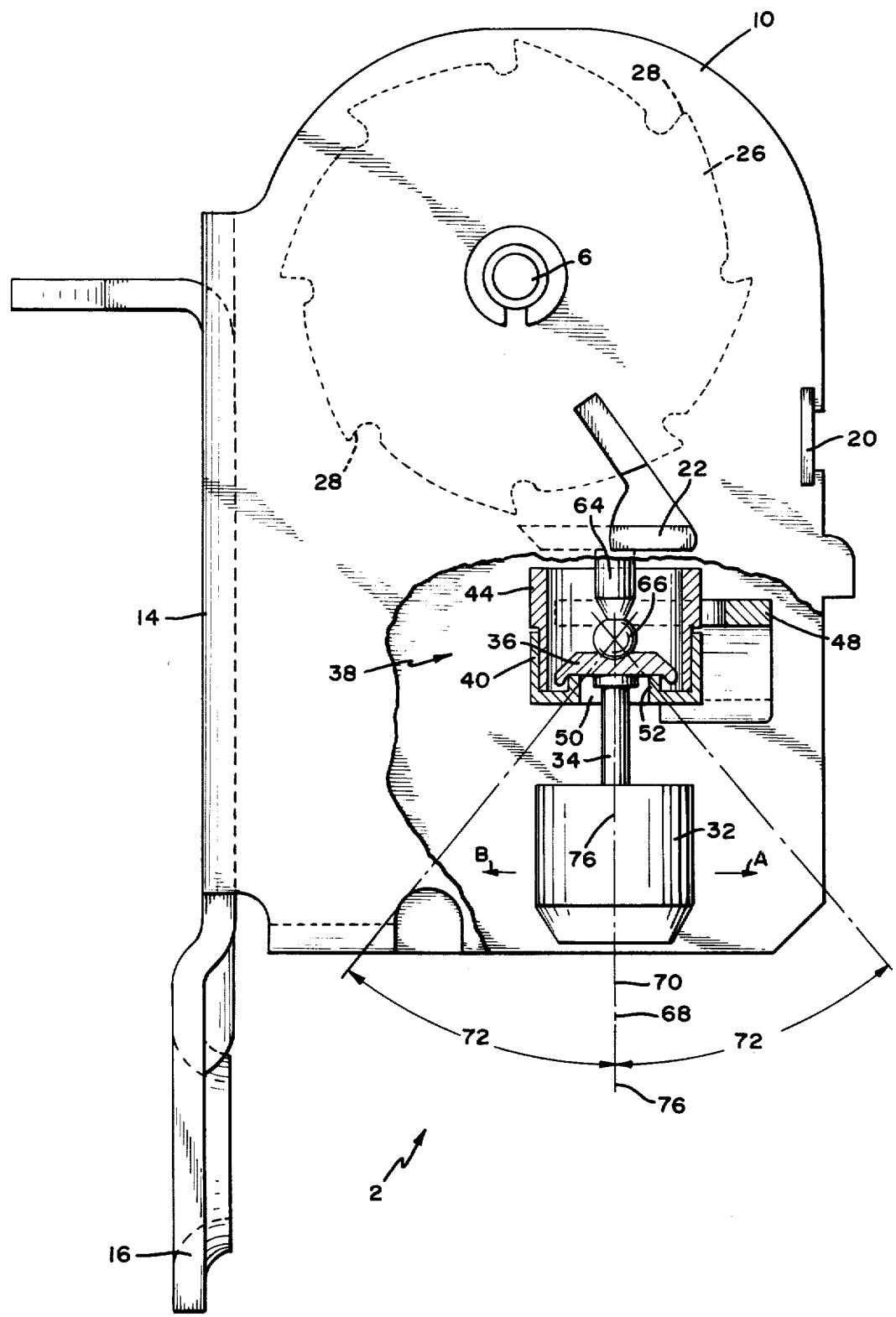
FIG. 2 is a side view of FIG. 1 with a portion broken away to show the improved inertia mechanism, support, and actuating means, showing the retractor in a vertical position.
Figure 3:
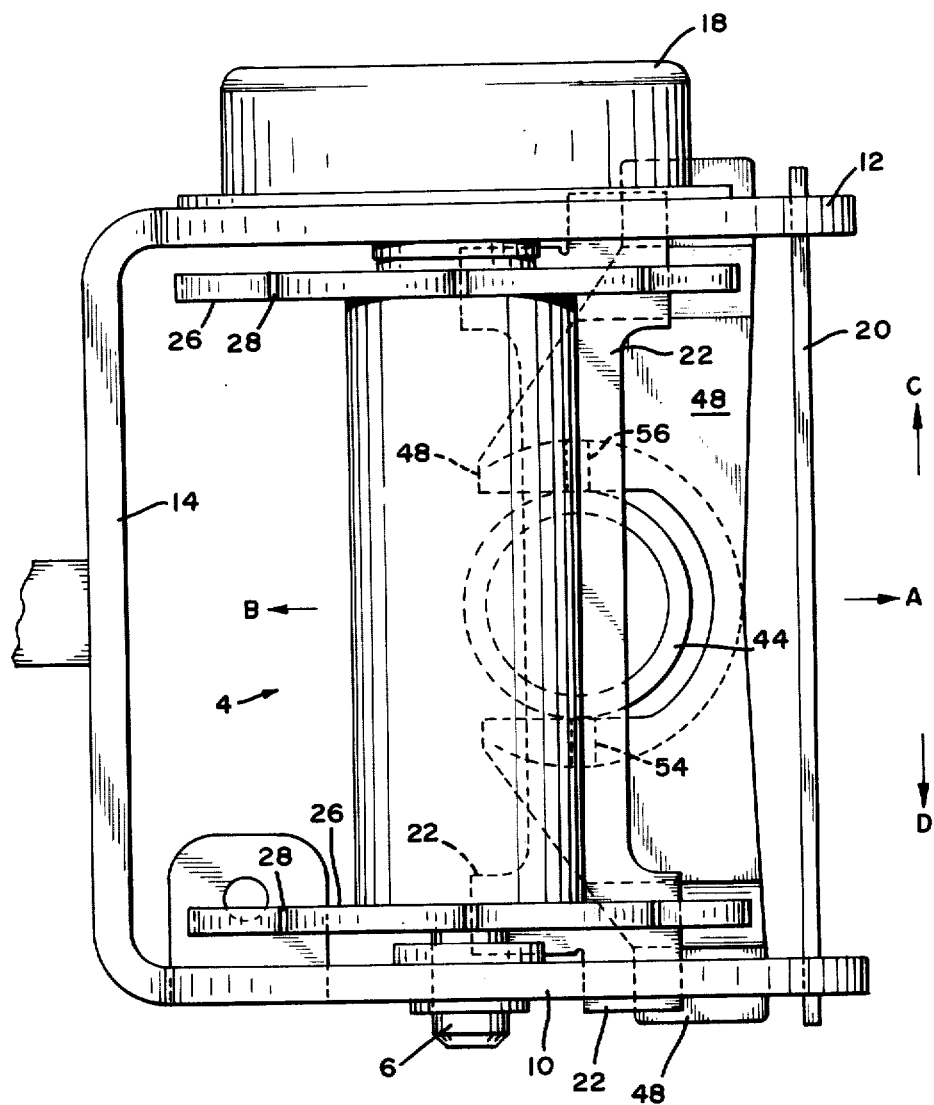
FIG. 3 is a top view of FIG. 2.

Referring to FIGS. 1, 2 and 3, the retractor, referred to generally by the numeral 2, has a reel means 4, including a reel shaft 6, rotatably mounted on a support means 8. The support means 8 is a load bearing member and includes two side walls 10 and 12 and a back wall 14. The support means 8 also includes a mounting means 16 in the form of a rigid extension adapted to be bolted or otherwise secured to an anchorage point in a vehicle (not shown).

A belt (not shown) is adapted to be attached to the reel shaft 6 for winding and unwinding thereon. The reel means 4 includes a biasing means, such as a tension return spring, inside a housing 18, which urges the reel shaft 6 to turn in a winding direction. The winding direction of the reel shaft 6 retracts the belt into the retractor 2. The opposite unwinding direction of the reel shaft 6 allows withdrawal of the belt from the retractor 2.

The two side walls 10 and 12 of the support structure 8 are disposed substantially parallel to one another and substantially perpendicular to the back wall 14. The support structure 8 also includes a cross member 20 extending between the side walls 10 and 12 and at the opposite side of the side walls 10 and 12 from the back wall 14. The retractor 2 further includes a means for locking the reel means 4, such as a pawl 22 and a ratchet means 24. The ratchet means 24 includes at least one ratchet wheel 26, and preferably, two ratchet wheels 26. The ratchet wheels 26 have ratchet teeth 28 (FIG. 2) on their outer circumferences and are fixedly mounted on the reel shaft 6. The pawl 22 is pivotally mounted on the side walls 10 and 12 and extends between the side wall 10 and 12. The pawl 22 is adapted to pivot from an unlocked position, shown in FIG. 2 by dashed lines to a locked position. In the locked position, the pawl 22 is pivoted into engagement with teeth 28 of the ratchet wheels 26.

The retractor 2 further includes an inertia mechanism, a support for the inertia mechanism and an actuating means, all of which are adapted to cooperate to actuate the pawl from its unlocked position to its locked position during emergency situations. The inertia mechanism, support mechanism and actuating means may be mounted inside the retractor, as illustrated in the drawings, or may be mounted outside the retractor on the outer side of one of the side walls 10 of the support structure 8. The inertia mechanism is a lower pendulum assembly 30 which is best shown in FIGS. 1 and 2. The lower pendulum assembly 30 includes a lower pendulum weight 32, a lower pendulum rod 34, and a lower pendulum head 36. The pendulum rod 34 has an upper end and a lower end. The upper end of the pendulum rod 34 is connected to the pendulum head 36. The lower end of the pendulum rod 34 is connected to the lower pendulum weight 32.

The support for the lower pendulum assembly 30 is an upper pendulum assembly 38 which includes a trunnion 40, a swivel axis 42 for the trunnion 40 (FIG. 1), an optional trunnion weight 44, and a support member 48 for the trunnion 40. The trunnion 40 may be any concave vessel, such as a vessel having either a cylindrical shape, or a cup shape, or an inverted dome shape, or an inverted conical shape. The lower pendulum rod 34 extends from the pendulum head 36 of the lower pendulum assembly 30 through an aperture 50 in a bottom central portion of the trunnion 40 of the upper pendulum assembly 38. The trunnion 40 of the upper pendulum assembly 38 has an upturned, substantially circular support edge 52 arouud the circumference of the aperture 50. The pendulum head 36 of the lower pendulum assembly 30 is disposed on the support edge 52 within the trunnion 40 of the upper pendulum assembly 38.

The swivel axis 42 for the trunnion 40 is formed by two aligned axles 54 and 56, one axle on each of two opposing sides of the trunnion 40. The swivel axis 42 for the trunnion 40 is substantially parallel to a longitudinal axis of the reel 6. The axles 54 and 56 of the trunnion 40 extend into and are journaled in the support member 48. The support member 48 is fixedly mounted on and between the side walls 10 and 12 and supports the upper pendulum assembly 38 and the lower pendulum assembly 30. The trunnion axles 54 and 56 enable the trunnin 40 to pivot with reference to the support member 48 in two lateral directions in one plane indicated by arrows A and B in FIGS. 2 and 3. The trunnion weight 44 forms the upper part of the trunnion 40 and encourages the pivoting motion of the trunnion 40. The trunnion 40 of the upper pendulum assembly 38 pivots independently of the lower pendulum assembly 30. As a result, this retractor 2 has two pendulum mechanisms: one pendulum mechanism being lower pendulum assembly 30 and the second pendulum mechanism being trunnion 40. Thus, the retractor 2 has two separate pivoting actions: The first pivoting action is between the lower pendulum assembly 30 and the trunnion 40. The pendulum head 36 pivots on the substantially circular support edge 52 which allows the lower pendulum assembly 30 to pivot in an infinite variety of lateral directions. The second pivoting action is between the trunnion 40 and the support member 48. The trunnion 40 pivots in two directions A and B in one plane by means of swivel axis 42 with reference to support member 48.

The actuating means is actuating post 64 disposed above the pendulum head 36. The post 64 is connected to the means of locking the retractor 2. Preferably, the past 64 is connected to the lower side of the pawl 22 and the post 64 has a rounded portion 66 at its lower end which rests on the pendulum head 36. If the pendulum assembly 30 and support assembly 38 are mounted on the outer side of one of the side walls 10 of the support structure 8, the pawl 22 must extend through such side wall 10 to be actuated by the actuating post or a pawl and ratchet wheel must be located on the outer side of one of the side walls 10.

The trunnion 40 has longitudinal axis 68 passing through the center of aperture 50 of trunnion 40. The lower pendulum assembly 30 has a longitudinal axis 70 substantially parallel and coincident with the pendulum rod 34. The retractor 2 has a longitudinal axis 74. When the retractor 2 is substantially vertical, the longitudinal axis 70 of the lower pendulum assembly 30 in its static position is substantially parallel and coincident with the longitudinal axis 68 of the trunnion 40. The static position of the trunnion 40 is adjustable in two opposing lateral directions in one plane, indicated by arrows A and B in FIG. 2, from a static position wherein the longitudinal axis 68 of the trunnion 40 is disposed at an angle of approximately 0° (FIG. 2) to an angle 72 of up to approximately 30° (FIG. 4), or any angle between 0° and approximately 30°, with reference to the longitudinal axis 74 of the retractor 2 or an axis 76 substantially parallel to the axis 74 of the retractor 2.

Figure 4:
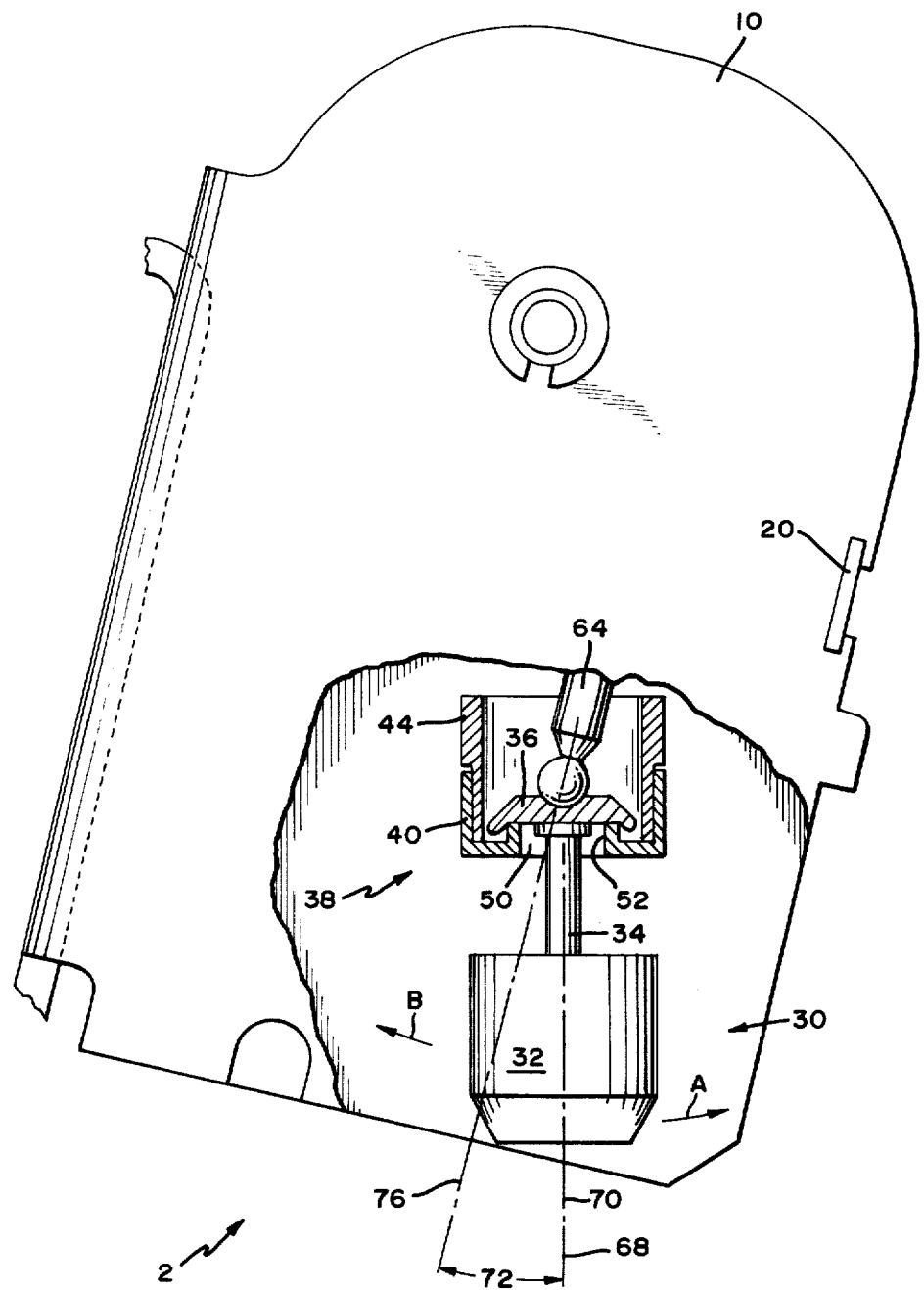
FIG. 4 is a partial section view which shows the retractor of FIG. 2 in tilted position.

Referring to FIG. 2, when the retractor 2 is disposed in the vehicle so that the longitudinal axis 74 and 76 of the retractor 2 is substantially vertical, the trunnion 40 and lower pendulum assembly 30 acting as one unit assume an operable static position with the angle between both the longitudinal axis 68 of the trunnion 40 and the longitudinal axis 70 of the lower pendulum assembly 30 being 0° with reference to the longitudinal axis 76 of the retractor 2. Referring to FIG. 4, when the retractor 2 has been installed in a vehicle so that the retractor 2 is tilted in the direction indicated by arrows A or B in FIG. 2 and the longitudinal axis 74 of the retractor 2 is at an angle 72 (FIG. 4) of up to approximately 30° with the vertical plane, the trunnion 40 and lower pendulum assembly 30 acting as one unit assume an operable static position with the longitudinal axis 68 of the trunnion 40 and the longitudinal axis 70 of the lower pendulum assembly 30 disposed at an angle 72 of up to approximately 30° with reference to the longitudinal axis 76 of the retractor 2.

The retractor 2 is not intended to be tilted in a direction substantially parallel to the swivel axis 42 of the trunnion 40, that is, a direction indicated by arrows C or D in FIG. 1, for installation in a vehicle because the trunnion 40 has no axles or axis upon which to pivot in these directions with reference to the support member 48. In contrast, when the retractor 2 is tilted in a direction substantially perpendicular to the swivel axis 42 of the gimbal 40, that is, in a direction indicated by arrows A or B in FIG. 2, the longitudinal axis 68 of the trunnion 40 does not remain substantially parallel to the longitudinal axis 74 of the retractor 2. Instead, the longitudinal axis 68 of the trunnion 40 and the lower pendulum assembly 30 acting as one unit tend to remain substantially parallel to the vertical plane, as shown in FIG. 4, because the trunnion 40 has a swivel axis 42 and swivel axles 54 and 56 upon which to pivot.

It is the longitudinal axis 76 of the retractor 2 that assumes an angle 72 with reference to the vertical plane by movement in one plane in the direction A or B. This automatic adjustment of the static position of the trunnion 40 and lower pendulum assembly 30 takes place by means of the pivoting action between the trunnion 40 and the support member 48 in one plane in the direction A or B. As a result, the retractor 2 may be installed in a vehicle in a tilted configuration of up to 30° with reference to the vertical plane.

During normal operation of the retractor 2 after installation, when the vehicle is not in a dangerous situation, the pendulum head 36 continues to rest on the support edge 50 in any one of its operable static positions, as shown in FIGS. 2 or 4. During normal operation of the retractor 2, when the vehicle is not in a dangerous situation, the pawl actuating post 64 rests in its unlocked position on top of the pendulum head 36. The actuating post 64 is connected to the underside of the pawl 22 and the pawl 22 remains in its unlocked position.

Figure 5:
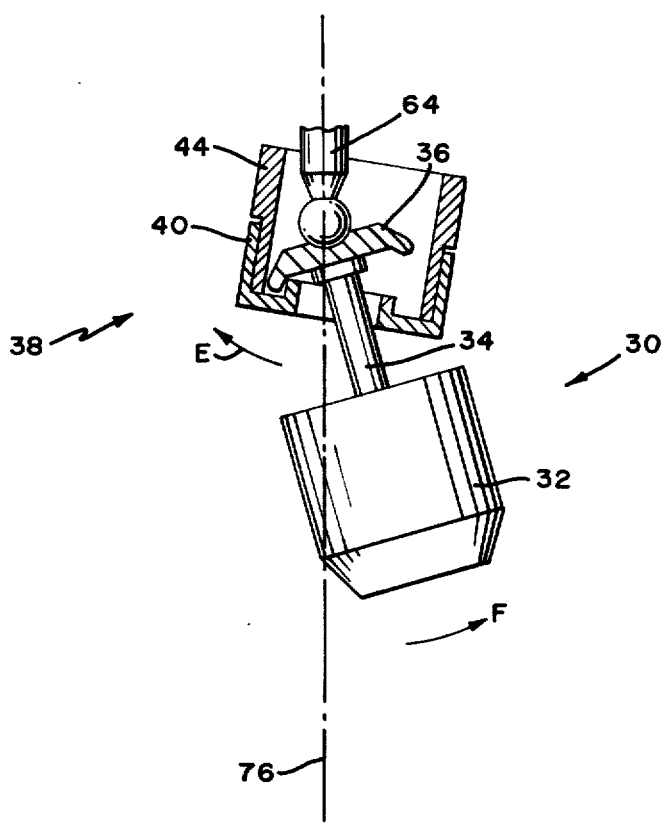
FIG. 5 is a partial section view which shows the improved inertia mechanism and support of FIG. 2 after actuation.

When sudden movement of the vehicle, such as acceleration, deceleration or change in orientation of the vehicle, exceeds a predetermined magnitude, the pendulum head 36 is lifted up and off the support edge 50. Such movement of the pendulum head 36 lifts the actuating post 64, which in turn lifts the pawl 22, causing the pawl 22 to pivot into engagement with the ratchet wheels 26. Such engagement of the ratchet wheel 26 may occur when the lower pendulum assembly 30 swings in any lateral direction, such as the direction C or D (FIG. 1) or in the direction A or B (FIG. 2). Referring to FIGS. 2, 3 and 5, when sudden movement of the vehicle swings the lower pendulum assembly 30 in the direction A or B, it swings independently of trunnion 40. Referring to FIG. 5, trunnion 40 swings in the opposite direction (arrow E) to the direction (arrow F) of lower pendulum assembly 30, providing a double pendulum effect.

Under static conditions, in the absence of any sudden movement of the vehicle, the combined center of gravity of the trunnion 40 and lower pendulum assembly 30 is below the swivel axis 42. As a result, the trunnion 40 and lower pendulum assembly 30 pivot together as one unit to adjust automatically to tilting of the retractor 2 and do not actuate the pawl 22. Under dynamic conditions, resulting from sudden movement of the vehicle, the center of gravity of the lower pendulum assembly 30 is below the swivel axis 42. The center of gravity of the trunnion 40 and trunnion weight 44 is above the swivel axis 42. A horizontal force component causes relative pivoting motion between the trunnion 40 and lower pendulum assembly 30 in opposite directions, each acting independently of the other.

The lower pendulum assembly 30, trunnion 40, and support member 48 provide a simple, but effective, vehicle-sensitive, inertia-operated mechanism adapted to lock the retractor 2 and thereby restrain an occupant of the vehicle during emergency situations. As a result, when the vehicle is subjected to sudden braking, cornering, or overturning, for example, the lower pendulum assembly 30 causes the ratchet wheels 26 to prevent the belt from being withdrawn any further from the retractor 2, thereby restraining the occupant of the vehicle wearing the safety belt. The lower pendulum assembly 30, trunnion 40, and support member 48 are highly reliable in operation and inexpensive to manufacture. A typical location for this retractor is on the back of a seat with the directions of arrows A and B arranged parallel to the fore and aft directions of the vehicle and with the angle of orientation or tilt of the retractor changing with the position of the seat.

We claim:

1. In a vehicle-sensitive, inertia operated safety belt retractor having a reel for winding a safety belt, means to lock the reel and thereby restrain an occupant of the vehicle during dangerous situations, an inertia mechanism, a support mounted on said retractor for supporting the inertia mechanism, and an actuating means responsive to said inertia mechanism for operating the means for locking the reel; the improvement wherein:

said inertia mechanism is a lower pendulum assembly which includes a pendulum head in contact with said actuating means, said pendulum assembly being actuated by forces exceeding a predetermined magnitude resulting from a sudden change in the motion or orientation of the vehicle, said actuation means operating directly on the means for locking the reel; and said support for said lower pendulum assembly is an upper pendulum assembly which includes: a trunnion which is a concave vessel having a substantially circular support edge upon which said pendulum head of said lower pendulum assembly is disposed, said lower pendulum assembly requiring a force exceeding a predetermined magnitude to lift a part of the pendulum head up and off a part of said support edge before said lower pendulum assembly will cause said locking means to lock the reel, said trunnion and said lower pendulum assembly being adapted to pivot in one plane to a variety of operable static positions to which said trunnion and said lower pendulum assembly are adjustable according to the position in which the retractor is oriented by virtue of installation in the vehicles; a swivel axis for said trunnion adapted to allow said trunnion to pivot in one plane; and a support member for said trunnion; upon actuation by forces resulting from a sudden change in the motion or orientation of the vehicle said trunnion and said lower pendulum assembly having independent action and pivoting in opposite directions; said lower pendulum assembly and said support having a compact configuration, sufficiently compact for said lower pendulum assembly and said support to be mounted either within said retractor or outside said retractor.

2. The vehicle-sensitive, inertia-operated safety belt retractor according to claim 1 wherein:

said actuating means is an actuating post disposed above said pendulum head of said lower pendulum assembly, said actuating post being connected to said means for locking said reel, said actuating post being disposed in an unlocked position when said lower pendulum assembly is at rest and said actuating post being moved to said locked position by said lower pendulum assembly during dangerous situations to lock said reel and prevent further unwinding of said belt.

3. The vehicle-sensitive, inertia-operated safety belt retractor according to claim 1 wherein:

said trunnion further comprises two swivel axles disposed on opposing sides of said trunnion, said swivel axles forming said trunnion swivel axis upon which said trunnion pivots in two lateral directions, said swivel axles being disposed in said support member for said trunnion.

4. The vehicle-sensitive, inertia-operated safety belt retractor according to claim 1 wherein:

said retractor has a longitudinal axis;

said trunnion has a longitudinal axis which is approximately perpendicular to the swivel axis for the trunnion; and said trunnion is adjustable in the two lateral directions in which said trunnion pivots from a static position wherein said longitudinal axis of said trunnion is disposed at an angle of approximately 0° to an angle of approximately 30° with reference to an axis substantially parallel to the longitudinal axis of said retractor.

5. The vehicle-sensitive, inertia-operated safety belt retractor according to claim 1 wherein:

said lower pendulum assembly further includes a lower pendulum weight and a lower pendulum rod;

said lower pendulum rod has an upper end and a lower end, said upper end of said rod being connected to said pendulum head, said lower end of said rod being connected to said lower pendulum weight; and said trunnion is a cylindrical vessel having a bottom central portion and an aperture in said bottom central portion, said circular support edge being disposed around said aperture, said pendulum rod being disposed through said aperture.

6. The vehicle-sensitive, inertia-operated safety belt retractor according to claim 1 wherein:

said retractor has a support structure which includes side walls;

said support member is mounted between said side walls; and said support assembly further includes a trunnion weight to encourage pivoting action of said trunnion.

* * * * *